(12) United States Patent
Satchell

(10) Patent No.: US 8,489,994 B2
(45) Date of Patent: Jul. 16, 2013

(54) SYSTEMS AND METHODS FOR COMMUNICATING

(75) Inventor: Christine Satchell, Brighton (AU)

(73) Assignee: Smart Internet Technology CRC Pty Ltd., Eveleigh (AU)

( * ) Notice: Subject to any disclaimer, the term of this patent is extended or adjusted under 35 U.S.C. 154(b) by 879 days.

(21) Appl. No.: 10/580,800

(22) PCT Filed: Nov. 29, 2004

(86) PCT No.: PCT/AU2004/001673
§ 371 (c)(1), (2), (4) Date: Feb. 7, 2007

(87) PCT Pub. No.: WO2005/052861
PCT Pub. Date: Jun. 9, 2005

(65) Prior Publication Data
US 2008/0134055 A1    Jun. 5, 2008

(30) Foreign Application Priority Data
Nov. 27, 2003  (AU) ................. 2003906544

(51) Int. Cl.
G06F 3/048 (2006.01)
G06F 15/16 (2006.01)

(52) U.S. Cl.
USPC ............ 715/734; 715/733; 715/706; 715/757

(58) Field of Classification Search
USPC .................... 715/757, 706, 734, 733
See application file for complete search history.

(56) References Cited

U.S. PATENT DOCUMENTS

| | | | |
|---|---|---|---|
| 5,784,001 A | 7/1998 | Deluca et al. | |
| 6,119,147 A | 9/2000 | Toomey et al. | |
| 6,817,979 B2* | 11/2004 | Nihtila | 600/300 |
| 7,086,005 B1* | 8/2006 | Matsuda | 715/706 |
| 7,181,690 B1* | 2/2007 | Leahy et al. | 715/706 |
| 7,404,148 B2* | 7/2008 | Lincke et al. | 715/805 |
| 7,685,518 B2* | 3/2010 | Matsuda et al. | 715/706 |
| 7,995,090 B2* | 8/2011 | Liu et al. | 348/14.01 |
| 2002/0002586 A1* | 1/2002 | Rafal et al. | 709/205 |
| 2003/0028596 A1* | 2/2003 | Toyota et al. | 709/204 |
| 2003/0080989 A1* | 5/2003 | Matsuda et al. | 345/706 |
| 2004/0002634 A1* | 1/2004 | Nihtila | 600/300 |
| 2004/0097221 A1* | 5/2004 | Lee | 455/419 |
| 2004/0179039 A1* | 9/2004 | Blattner et al. | 345/758 |
| 2006/0046699 A1* | 3/2006 | Guyot et al. | 455/414.1 |

FOREIGN PATENT DOCUMENTS

| | | |
|---|---|---|
| EP | 1 326 445 A2 | 7/2003 |
| EP | 1429291 A1 | 6/2004 |
| JP | 2001-87559 A | 4/2001 |
| WO | 02/17602 A1 | 2/2002 |
| WO | 03/084258 A1 | 10/2003 |

* cited by examiner

Primary Examiner — Daeho Song
(74) Attorney, Agent, or Firm — Knobbe Martens Olson & Bear LLP

(57) ABSTRACT

A communication system comprising one or more computer readable mediums; comprising determining means operable to determine an attribute of a communication device; identifying means operable to identify an avatar by using the attribute, wherein the avatar is such that it conveys to a viewer thereof information about a person; and communicating means operable to communicate the avatar to the communication device in a virtual environment

29 Claims, 4 Drawing Sheets

SYSTEMS AND METHODS FOR COMMUNICATING

FIELD OF THE INVENTION

The present invention relates generally to systems and methods for communicating. More specifically, the present invention has particular—but by no means exclusive—application to communicating via mobile communication devices such as a mobile telephone.

BACKGROUND OF THE INVENTION

Whilst today's mobile telephone networks have undoubtedly enhanced our ability to communicate with each other, there are several aspects of their functionality that could be improved in order to further enhance our ability to efficiently communicate with each other. One aspect that could be improved is the ability for a user of a mobile telephone to readily determine what another mobile telephone user is doing without having to communicate directly (for instance, speak) with the user of the mobile telephone. For example, it would be advantageous if the user of a mobile telephone could program the telephone network (or their mobile telephone) to provide information that informs parties calling the mobile telephone that the user thereof is currently in a meeting without having to communicate directly with the user. At present, the user of the mobile telephone would either have to speak directly with the calling party to inform them that they are in a meeting, or the user of the mobile telephone would have to engage in SMS messaging to inform the calling party that they are in a meeting.

Another aspect of mobile telephone networks that could be improved is their ability to allow a person to easily join a group of people and communicate efficiently with them. At present the person has to go through the rather cumbersome task of organising or arranging a time to communicate with the group and establishing a conference call between the members of the group.

SUMMARY OF THE INVENTION

According to a first aspect of the present invention there is provided a communication system. A particular embodiment of the communication system comprises:
determining means operable to determine an attribute of a communication device;
identifying means operable to identify an avatar by using the attribute, wherein the avatar is such that it conveys to a viewer thereof information about a person; and
communicating means operable to communicate the avatar to the communication device.

By communicating the avatar to the communication device a user (the viewer) thereof is able to obtain information about the person without the user and the person communicating directly with each other. More specifically, if the person was at work and wanted to convey this information to the viewer then the avatar could, for example, depict the person in a business suit carrying a briefcase.

The word "avatar" as used throughout this specification is a reference to a form of image (such as a digital photograph or animated icon), which when viewed conveys some information about an activity that the person is involved in.

The particular embodiment of the communication system further comprises replacing means operable to replace the avatar with another avatar.

The replacing means enables different information about the person to be conveyed to the viewer. For instance, an initial avatar may indicate that the person is at work, whilst a replacement avatar may indicate that the person is out shopping. The replacement avatar that represents the person out shopping could, for example, be an image of the person carrying shopping bags. An advantage of being able to replace the avatar is that it effectively allows the person to inform the viewer of changes in activities that the person is involved in. Persons skilled in the art will readily appreciate that replacing the avatar also comprises changing a visual aspect of the avatar.

In the particular embodiment of the communication system the identifying means is operable to identify the avatar by comparing the attribute to a communication device identifier that is associated with the avatar.

Comparing the attribute to the communication device identifier effectively enables the avatar to be selected based on, for example, a telephone number of the communication device.

The particular embodiment of the communication system further comprises recording means arranged to allow the person to record the communication device identifier.

Thus, the recording means effectively provides a mechanism for allowing the person to control who will receive the avatar. For example, the avatar may only be sent to the communication device if the attribute matches the communication device identifier recorded by the recording means. In the event that the attribute does not match the communication device identifier, then the avatar will not be sent to the communication device.

In the particular embodiment of the communication system the replacing means is further operable to replace the communication device identifier with another communication device identifier.

Being able to replace the communication device identifier enables a change in respect of allowing another communication device to receive the avatar.

The particular embodiment of the communication system further comprises selecting means operable to allow the person to select the avatar from a plurality of other avatars.

Being able to select the avatar from a plurality of other avatars is advantageous because it enables an appropriate avatar to be selected to represent the activity that the person is engaged in. Each of the avatars could depict different activities that the person could undertake.

In the particular embodiment of the communication system the selecting means is further operable to allow the communication device identifier to be selected from a plurality of other communication device identifiers.

In the particular embodiment of the communication system the communicating means is operable to communicate the avatar to the communication device in a virtual environment.

Conveying the avatar in the virtual environment is advantageous because it allows further information to be conveyed to the viewer. For example, if the person is at work then the virtual environment may represent a virtual office, which includes images of, for example, a desk and chairs. Furthermore, depicting the avatar in the virtual environment has the ability to make the system more appealing to users of the system.

In the particular embodiment of the communication system the determining means is operable to determine the attribute by processing caller identification data associated with the communication device.

In the particular embodiment of the communication system the system further comprises messaging means operable to create a text, an audio and/or a video message that is associated with the avatar.

Conveying the text, the audio and/or the video message provides yet another mechanism for conveying further information to the user of the communication device.

In the particular embodiment of the communication system the avatar and the plurality of other avatars depict an activity that involves the person.

In the particular embodiment of the communication system the communication device comprises a mobile telephone and the attribute comprises a telephone number of the mobile telephone.

According to a second aspect of the present invention there is provided a communication system. A particular embodiment of the communication system comprises:

an environment support means operable to support at least one virtual environment that can be accessed by a first person; and a communicating means operable to communicate an avatar in the virtual environment to the first person subsequent to the first person accessing the environment, the avatar being such that it can convey to the first person information about a second person.

The ability to communicate the avatar in the virtual environment has the advantage of facilitating the formation of spontaneous, multiple, virtual social and/or business networks. Thus, improving the attractiveness of the system to users.

In the particular embodiment of the communication system the environment support means is operable to determine a level of authority associated with the second person, and provide the second person with access to the virtual environment if the level of authority is deemed appropriate.

The ability to provide access to the virtual environment based on the level of authority has the advantage of facilitating control over who can access the virtual environment.

In the particular embodiment of the communication system the environment support means is operable to allow the first person to assign the level of authority.

In the particular embodiment of the communication system the environment support means is such that it allows the first person to arrange the virtual environment such that it has a desired appearance.

Being able to arrange the virtual environment is particularly useful in a situation where the virtual environment models, for example, a virtual office. Arranging the virtual office can include, for instance, placing a desk and picture in a required location. The effect of this is that the virtual environment take on an appearance that suits the first person.

In the particular embodiment of the communication system the environment support means is operable to allow the first person and the second person to exchange other information via the virtual environment.

In the particular embodiment of the communication system the other information comprises multi-media content.

In the particular embodiment of the communication system the communicating means is further operable to allow the second person to control whether the avatar conveys the information to the first person.

Controlling whether the avatar conveys the information to the first person ensures that the first person only receives information that the second person wants the first person to receive.

In the particular embodiment of the communication system the environment support means is operable to allow the first person to access the virtual environment via a communication network, the communicating means also being operable to communicate the avatar in the virtual environment to the first person via the communication network.

Thus, providing the advantage of allowing the first person to access the environment from a remote location, and receive the avatar in the virtual environment at the remote location.

In the particular embodiment of the communication system the information conveyed by the avatar to the first person comprises audio and/or video information.

According to a third aspect of the present invention there is provided a communication system. A particular embodiment of the communication system comprises:

identifying means operable to identify an avatar that conveys to a viewer thereof information about a person; and communicating means operable to communicate the avatar to a mobile communication device.

According to a fourth aspect of the present invention there is provided a communication method. A particular embodiment of the communication method comprises the steps of:

determining an attribute of a communication device;

identifying an avatar by using the attribute, wherein the avatar is such that it conveys to a viewer thereof information about a person; and communicating the avatar to the communication device.

The particular embodiment of the communication method further comprises the step of replacing the avatar with another avatar.

In the particular embodiment of the communication method the step of identifying the avatar comprises identifying the avatar by comparing the attribute to a communication device identifier that is associated with the avatar.

The particular embodiment of the communication method further comprises the step of recording the communication device identifier.

The particular embodiment of the communication method further comprises the step of replacing the communication device identifier with another communication device identifier.

The particular embodiment of the communication method further comprises the step of selecting the avatar from a plurality of other avatars.

The particular embodiment of the communication method further comprises the step of selecting the communication device identifier from a plurality of other communication device identifiers.

The particular embodiment of the communication method further comprises the step of communicating the avatar to the communication device in a virtual environment.

In the particular embodiment of the communication method the step of determining the attribute comprises determining the attribute by processing caller identification data that is associated with the communication device.

The particular embodiment of the communication method further comprises the step of creating a text, an audio and/or a video message that is associated with the avatar.

In the embodiment of the communication method the avatar and the plurality of other avatars depict an activity that involves the person.

In the particular embodiment of the communication method the first communication device is a mobile telephone and the attribute is a telephone number of the mobile telephone.

According to a fifth aspect of the present invention there is provided a communication method. A particular embodiment of the communication method comprises the steps of:

supporting at least one virtual environment that can be accessed by a first person; and communicating an avatar in the virtual environment to the first person subsequent to the first person accessing the environment, the avatar being such that it can convey to the first person information about a second person.

The particular embodiment of the communication method further comprises the step of determining a level of authority associated with the second person, and providing the second person with access to the virtual environment if the level of authority is deemed appropriate.

The particular embodiment of the communication method comprises, the step of the first person assigning the level of authority.

In the particular embodiment of the communication method the step of supporting the virtual environment comprises arranging the virtual environment such that it has a desired appearance.

The particular embodiment of the communication method comprises the step of exchanging other information between the first person and the second person via the virtual environment.

In the particular embodiment of the communication method, the other information comprises multi-media content.

In the particular embodiment of the communication method the step of communicating the avatar to the first person comprises controlling whether the avatar conveys the information to the first person.

The particular embodiment of the communication method further comprises the step of allowing the first person to access the virtual environment via a communication network, and the step of communicating the avatar in the virtual environment to the first person via the communication network.

In the particular embodiment of the communication method the information conveyed by the avatar to the first person comprises audio and/or video information.

According to a sixth aspect of the present invention there is provided software comprising at least one instruction for causing a computing device to carry out at least one of the particular embodiments of the communication method.

According to a seventh aspect of the present invention there is provided a computer readable medium comprising the software for causing the computing device to carry out the at least one of the particular embodiments of the communication method.

BRIEF DESCRIPTION OF THE DRAWINGS

Notwithstanding any other embodiments that may fall within the scope of the present invention, an embodiment of the present invention will now be described, by way of example only, with reference to the accompanying figures, in which.

AN EMBODIMENT OF THE INVENTION

Figure 1:
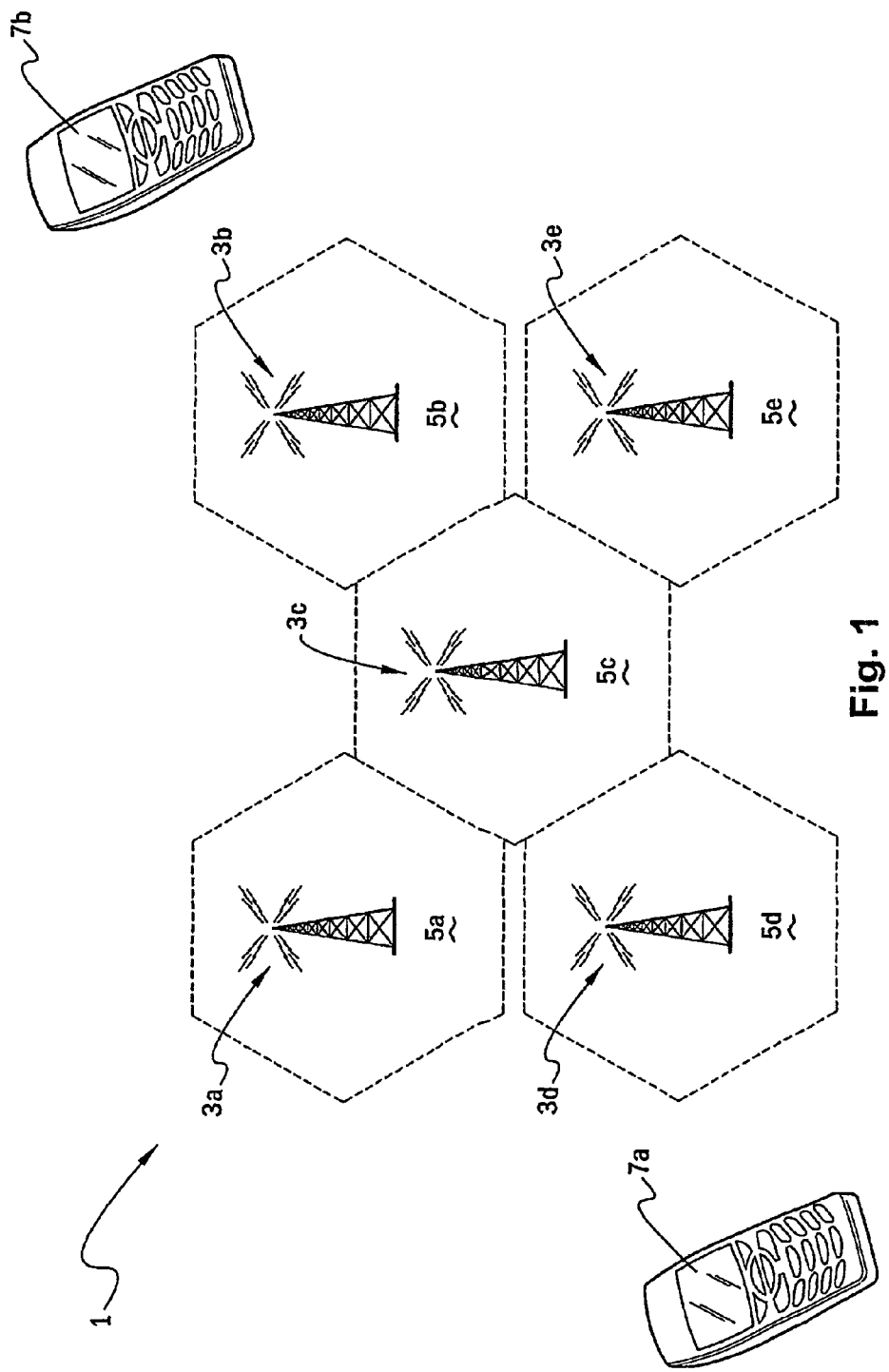
FIG. 1 provides a schematic diagram of an embodiment of the present invention, which is in the form of a mobile telephone system.

With reference to FIG. 1, which is an embodiment of the present invention in the form of a mobile telephone system 1, the system 1 comprises numerous base stations 3 that are spread out over an area of land. Each base station 3 provides network service to a unique region 5 of the area. The regions 5 are also commonly referred to as cells. The region 5 associated with each base station 3 is defined by the broken lines shown in FIG. 1. Each base station 3 is under the control of a supervising computer system (not shown) so that the base stations 3 operate in a coordinated manner. As persons skilled in the art will readily appreciate, each base station 3 essentially comprises a computer controlled radio transmitter and radio receiver, and at least one antenna mounted atop a tower. The radio transmitter and radio receiver are connected to the antenna via coaxial cable. Whilst not illustrated in the figures, the mobile telephone system 1 can be accessed via other communication networks including the Internet using for example GPRS service in the system 1, and the traditional 'landline' telephone network (PSTN).

The mobile telephone system 1 also comprises numerous mobile telephone handsets 7. As the mobile telephone handsets move across the area they move in and out of the various regions 5. Each mobile telephone handset 7 is arranged to communicate with the base station 3 that provides network service to the region 5 in which the mobile telephone handset 7 is located. For example, if the mobile telephone handset 7a were located in region 5d then it would communicate with base station 3d. To communicate with other telecommunication devices (such as a traditional landline telephone or another mobile telephone 7), the mobile telephone handsets 7 and base stations 3 communicate with each other using mobile telephone transmission technology such as, for example, GSM or CDMA.

Each mobile telephone handset 7 comprises a determining means, an identifying means and a communicating means, all of which are in the form of software that is run on the hardware of a mobile telephone handset 7. In this particular embodiment of the present invention, the software is based on the Java programming language, which provides the advantage of making the software usable on different telephone handsets 7 that have dissimilar hardware. It is envisaged, however, that the software could be written in other programming languages ranging from assembly language to C++.

Essentially, the determining means enables a telephone handset 7 to determine an attribute of a telephone that is attempting to call a telephone handset 7. In the case of the present embodiment of the invention, the attribute is the telephone number of the telephone that is attempting to call the telephone handset 7. The telephone that is attempting to call the telephone handset 7 could be either a traditional landline telephone (such as that installed at a home or office) or one of the telephone handsets 7. The determining means determines the attribute (the telephone number of the calling telephone) by processing caller identification data, which is transmitted to the telephone handset 7 via a base station 3. As persons skilled in the art will readily appreciate, the caller identification data is generated by the telephone network.

It will be readily-appreciated by those skilled in the art that the present invention is not restricted to determining an attribute in the form of the telephone number of the calling telephone. It is envisaged that other embodiments of the present invention may determine other forms of the attribute such as, for example, a PIN code associated with the person using the calling telephone, or an IP address of a computer attempting to contact a telephone handset 7 via a GPRS service.

Once the determining means has determined the attribute, the identifying means uses the attribute to identify an avatar. As indicated previously, the word "avatar" as used throughout this specification is a reference to an image of some description (for example, a digital photograph or animated icon), which when viewed conveys some information about an activity that a person (that is, a user of the called mobile telephone handset 7) is engaged in. For instance, an avatar of a surfboard or book would respectively indicate that the user of the called mobile telephone handset 7 is out surfing or reading.

It is noted that the present embodiment of the invention is not restricted to use in a social context and has application to other contexts including a business context. In the business context the avatar may represent an image of, for example, a CEO in an aeroplane or in a vehicle to depict the fact that the CEO is travelling. Being able to use the embodiment of the present invention in a business context is particularly advantageous because it enables managers and staff to effectively communicate information about their status to other staff, and importantly enables the CEO (who is undoubtly an extremely busy person) to efficiently manage contact with business colleagues In using the attribute to identify the avatar, the identifying means basically searches through a 'library' of avatars each of which is associated with a communication device identifier, which as mentioned previously is effectively a telephone number. When searching through the library of avatars, the identifying means checks the communication device identifiers until it finds one that matches the attribute. On finding a matching communication device identifier, the identifying means identifies the avatar that is associated with the matching communication device identifier. In the present embodiment of the invention the library of avatars is contained in a permanent storage device, such as a SIM card or non-volatile RAM of a mobile telephone handset 7.

Subsequent to identifying the avatar, the communication means communicates (transmits) the identified avatar in a virtual environment to the telephone that called the mobile telephone handset 7. As discussed in more detail in the following paragraphs of this specification, the virtual environment effectively models a virtual room such as, for example, a boardroom or a lounge room. The advantage of depicting the avatar in the virtual environment is that it conveys more information than just the avatar. The mobile telephone handset 7 transmits the identified avatar in the virtual environment to the relevant base station 3, which inturn forwards the avatar in the virtual environment onto the calling telephone via the telephone network. When the telephone that called the mobile telephone 7 receives the avatar and the virtual environment sent by the communication means, the telephone presents the avatar in the virtual environment on a visual display so that the user of the telephone can view the avatar in the virtual environment and determine what the user of the called telephone handset 7 is doing.

Given that users of the mobile telephone handsets 7 are likely to want to convey different information as they become involved in different activities, each mobile telephone handset 7 also comprises selecting means for enabling a user of a telephone handset 7 to select the avatar from a plurality of different avatars, which are stored in the memory of a mobile telephone handset 7. For instance, the different avatars could include a picture of a surfboard, a picture of a book, a picture of an office, a picture of an aeroplane, or motor vehicle. In this case, the selecting means would enable a user of a mobile telephone handset 7 to select the picture of the office if the user wanted to indicate (to parties calling the user's mobile telephone handset 7) that they were currently at work.

The selecting means is in the form of software that is based on the Java programming language so that it can be easily deployed on different mobile telephone handsets 7. However, it is contemplated that the software may be based on other programming languages (such as C++) in an alternative embodiment of the present invention. The software embodying the selecting means is capable of retrieving the different avatars from the memory of the mobile telephones 7 and presenting the retrieved avatars on the visual display of the mobile telephone handsets 7. Furthermore, the selecting means is such that it enables a user of a mobile telephone handset 7 to browse through the avatars and select the required avatar via the keypad of the mobile telephone handsets 7.

Each mobile telephone handset 7 also comprises specifying means, which is in the form of software that runs on the hardware of the mobile telephone handsets 7. In this regard, the software embodying the specifying means is based on the Java language. It is, however, envisaged that the software could be based on other programming languages (for example C++) in alternative embodiments of the present invention. The specifying means enables a user of a mobile telephone 7 to specify the communication device identifier (that is, the telephone number) that is associated with the avatar. As described previously, the identifying means uses the communication device identifier when attempting to identify the avatar. The selecting means is arranged such that a user of the mobile telephone handset 7 can specify (enter) the communication device identifier by using the keypad of a mobile telephone handset 7. Being able to specify the communication device identifier is particularly advantageous because it enables the user to effectively control which avatar is sent to a particular calling telephone.

Each mobile telephone handset 7 also comprises an environment support means which is in the form of software running on the hardware of the telephone handsets 7. As with the other software loaded on the telephone handsets 7, the software embodying the environment support means is based on the Java programming language. However, in alternative embodiments of the present invention the environment support means could be implemented in other programming languages such as C++. The software that represents the environment support means is basically a graphics software package that supports virtual environments. The environment support means is operable to support one or more virtual environments that can be accessed by a user of a telephone handset 7. The environment support means is arranged to support the virtual environments by allowing users of the telephones 7 to create, maintain and delete the environments as required, all of which can be performed via the user interface of a mobile telephone handset 7. It is noted that the virtual environments can exist even though no users are accessing the environments.

Figure 2:
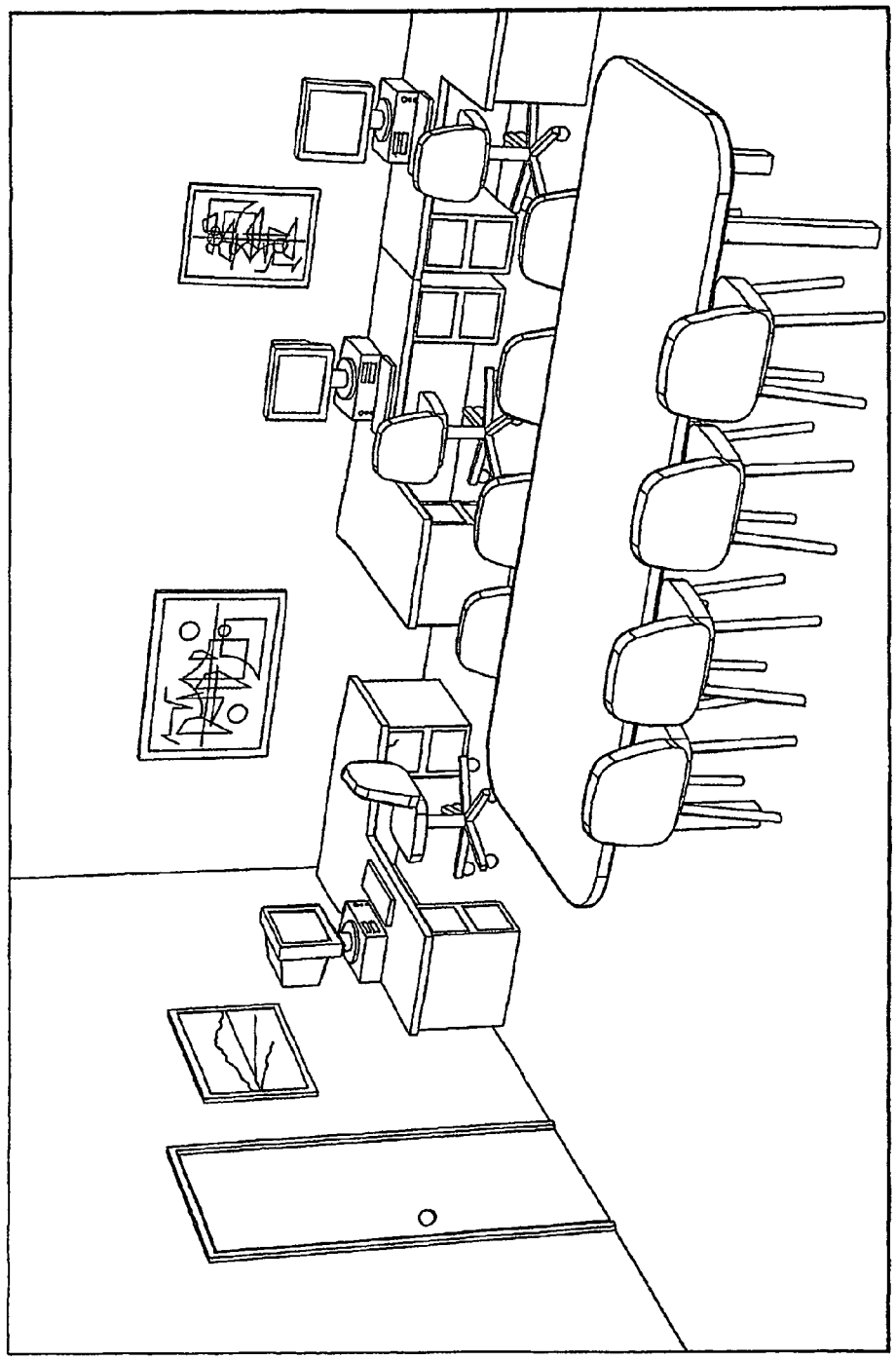
FIG. 2 provides an image of a virtual environment that is presented to a user of the system shown in FIG. 1.
Figure 3:
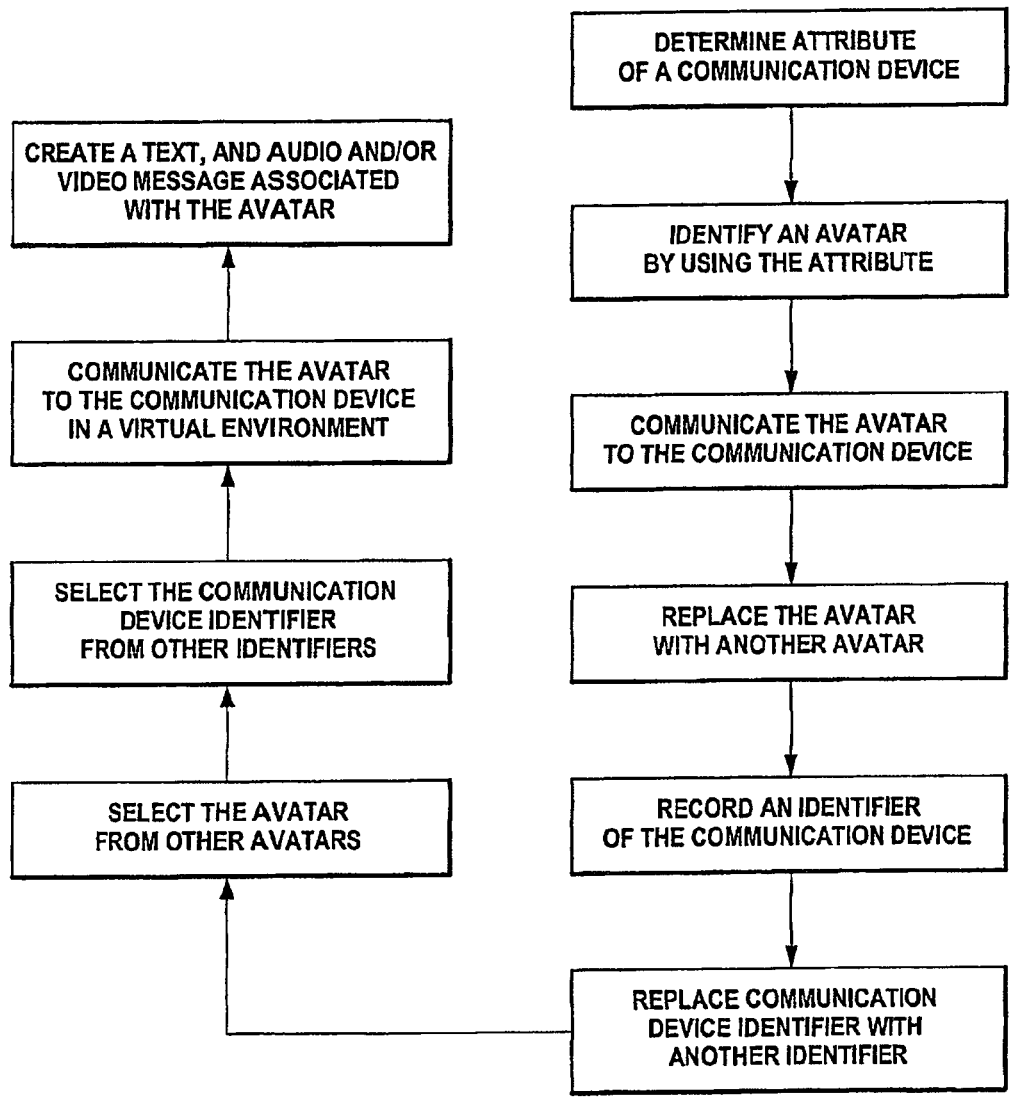
FIG. 3 shows a flow chart of a sequence of steps that are performed by the system illustrated in FIG. 1.
Figure 4:
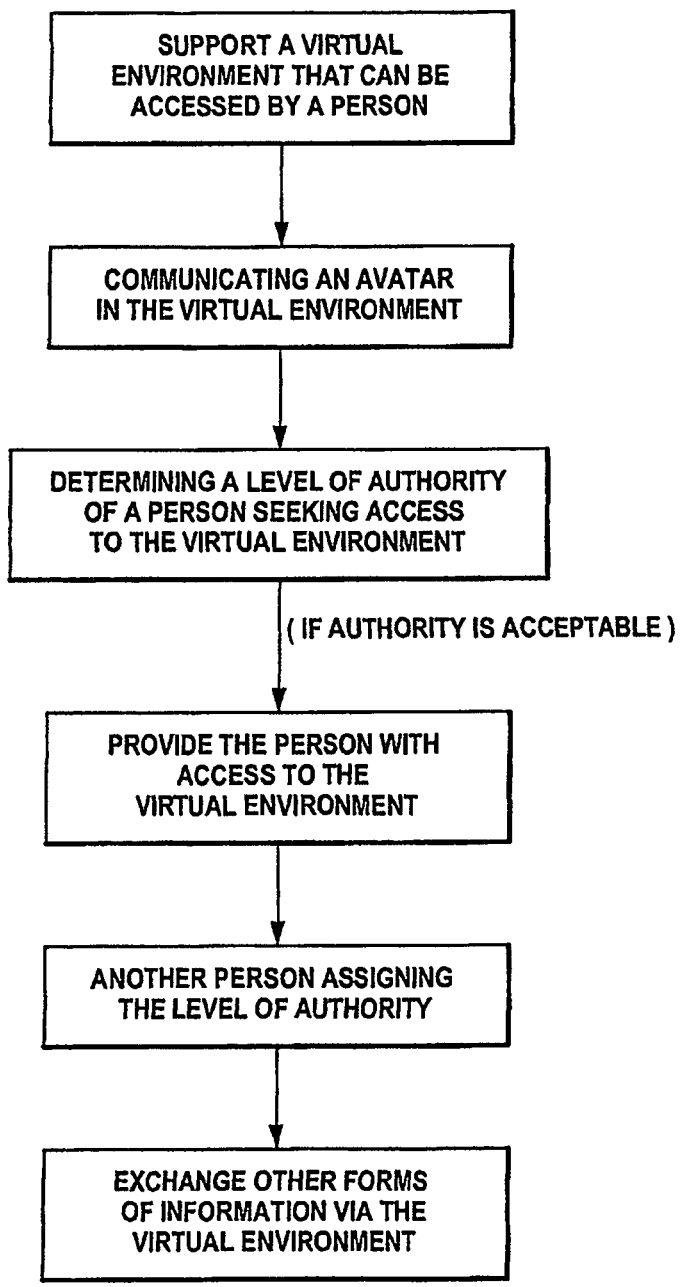
FIG. 4 shows a flow chart of another sequence of steps that are performed by the system illustrated in FIG. 1.

The environment support means is such that the virtual environments represent different virtual environments such as a lounge room or office that can be visited by telephone users (calling parties). An example of one possible virtual environment is shown in FIG. 2. When a person visits a virtual environment they are effectively accessing an environment supported by the environment support means. As part of maintaining the virtual environment, the environment support means allows a user of a mobile telephone handsets 7 to arrange the virtual environment such that it has a desired appearance. Effectively, this means that a user of a telephone handset 7 can, for example, hang a range of virtual pictures on the walls that define the virtual environment, or arrange the virtual furniture in the virtual environment. This allows a user of a telephone handset 7 to personalise the virtual environment.

In order to gain access to a virtual environment supported by the environment support means, a calling party effectively logs onto one of the mobile telephone handsets 7 via the base stations 3. In the present embodiment of the invention the process of logging onto the telephone handset 7 is by way of username and password. Basically, this involves calling a telephone handset 7 that is maintaining (via the environment support means) the virtual environment. Assuming that the log on process is successful, the environment support means will provide the calling party that has logged onto the telephone handset 7 with a list of virtual environments that are currently active on the called mobile telephone handset 7. It is noted that each of the virtual environments can be different, and by way of example one of the virtual environments may represent a virtual boardroom, another of the virtual environments may represent a virtual reception area of an office, and yet another of the virtual environment may represent the passenger compartment of an aeroplane.

By using the user interface of a telephone handset 7, the user that has logged onto one of the telephone handsets 7 selects one or more of the currently active virtual environments. Subsequent to selecting the one or more active virtual environments, the environment support means operating on the telephone handset 7 that the user has logged onto determines whether the user has been assigned an appropriate level of authority to access the selected virtual environments. The environment support means is such that it provides a user with access to the selected virtual environments provided the user has the appropriate level of authority to access the virtual environments.

The environment support means is such that it allows an administrator of the virtual environments (which is typically the person that created the environment) to set the level of authority required to access the environments, and assign a level of authority to users of the mobile telephone handsets 7. This allows the administrator to control access to the virtual environments, which can include denying certain people from gaining access to one or more of the virtual environments. This can be useful, for example, where a CEO of a business only wants to let certain people into his virtual office.

Once a person is provided with access to one or more selected virtual environments, they will be presented with one or more avatars each of which represents another user who is currently accessing the same virtual environment. The avatars are presented on the visual display of a mobile telephone handset 7. The avatars are presented in the virtual environment. The communicating means (referred to previous in this description of the embodiment of the invention) is further arranged to communicate the one or more avatars to the user. It is noted that when the user is provided with access to the one or more of the selected virtual environments the communicating means will provide the other users who are currently accessing the same environment with an avatar that represents the user that has just been provided with access to the environment. Thus, effectively making the virtual environment a substantially real-time environment that quickly conveys changes to the virtual environment.

The avatars communicated by the communicating means are arranged to convey information, in the form of audio information, to a user of a telephone handset 7 subsequent to being communicated to the users, which is typically via the visual display of a telephone handset 7 being used by the user. To present the audio information to the user the communicating means is arranged to interact with the audio circuit of the mobile telephone handset 7.

In addition to conveying information using the avatars, the present embodiment of the invention allows users who have been provided with access to the environments to use the environments to exchange other information, in the form of multi-media information, with each other.

The present embodiment of the invention also provides controlling means that is operable to allow a person that is represented by an avatar to control who can receive the information conveyed by the avatar. The controlling means is in the form of software that runs on the hardware of the telephone handsets 7. As with the other software that is loaded onto a telephone handset 7, the software embodying the controlling means is based on the Java programming language. However, it is envisaged that in other embodiments of the present invention the controlling means can be implemented in other languages such as C++. Effectively, the controlling means enables users who have been given access to the virtual environments to establish private communications with each other. If control is not exerted over who the avatar conveys the information to, the avatars will convey the information to all users that are accessing the virtual environment. Thus, the controlling means provides a mechanism for users to communicate in private.

Whilst the present embodiment of the invention has been described with particular application to a mobile telephone network, it will be readily appreciated by those skilled in the art that the present invention has application to other communication systems. For instance, the other communication systems could include a video conferencing system, an electronic messaging system (such as Internet based instant messaging), or computer communication systems. Furthermore, in alternative embodiments of the present invention the mobile telephone handsets 7 could be replaced with portable digital assistants (PDAs) that have suitable wireless interfaces that enable the PDAs to communicate via the system 1. An example of these types of PDAs are those available from BlackBerry.

Furthermore, it will be readily appreciated by those skilled in the art that even though the described embodiment of the present invention effectively indicates that the virtual environments are maintained on the mobile telephone handsets 7, an alternative embodiment of the present invention may have the virtual environments maintained on a computer system that forms part of the telephone network, in much the same way as many telecommunication networks now incorporate a voice mail service.

Those skilled in the art will appreciate that the invention described herein is susceptible to variations and modifications other than those specifically described. It should be understood that the invention includes all such variations and modifications which fall within the spirit and scope of the invention.

The invention claimed is:

1. A communication device, which is a first communication device, the first communication device comprising:
    a processor configured to execute instructions which:
        determine an identity associated with a second communication device and determine an identity associated with a third communication device;
        identify, based at least in part on the determined identity associated with the second communication device, a first image indicative of a first status of a user of the first communication device; and
        identify, based at least in part on the determined identity associated with the third communication device, a second image indicative of a second status of the user of the first communication device, the second status being different from the first status; and a transmitter configured to:
transmit, based on the determined identity associated with the second device, data indicative of the first image to the second communication device for display on the second communication device; and
transmit, based on the determined identity relating to the third device, data indicative of the second image to the third communication device for display on the third communication device,
wherein the first image is different from the second image, and wherein the first image is available for transmission to the second communication device at the same time the second image is available for transmission to the third communication device.

2. The communication device of claim 1, wherein the determined identity associated with the second communication device is a device identifier associated with the second communication device.

3. The communication device of claim 1, wherein the determined identity associated with the third communication device is a device identifier associated with the third communication device.

4. The communication device of claim 2, further comprising a memory configured to store the device identifier associated with the second communication device.

5. The communication device of claim 3, further comprising a memory configured to store the device identifier associated with the third communication device.

6. The communication device of claim 1, wherein the data transmitted by the transmitter is transmitted through a virtual environment.

7. The communication device of claim 6, wherein processor is further configured to execute instructions which define the virtual environment.

8. The communication device of claim 7, wherein the instructions which define the virtual environment are based at least in part on user input into the first communication device.

9. The communication device of claim 8, wherein the instructions which define the virtual environment include instructions defining access rights to the environment for the second communication device and the third communication device.

10. The communication device of claim 9, wherein the virtual environment is a real-time environment.

11. The communication device of claim 1, wherein the first image is an avatar.

12. The communication device of claim 1, wherein the first status of the user is indicative of an activity being engaged in by the user of the first communication device.

13. The communication device of claim 1, wherein the second status of the user is indicative of an activity being engaged in by the user of the first communication device.

14. The communication device of claim 1, wherein the first image comprises a video image.

15. The communication device of claim 1, further comprising audio information associated with the first image.

16. The communication device of claim 15, wherein the audio information is transmitted with the first image.

17. The communication device of claim 1, wherein the communication device is a mobile communication device.

18. A system for providing communication between mobile communication devices, the system comprising:
a receiver configured to receive from a first communication device data indicative of a first status and a second status of a user of the first communication device, the first status being different from the second status;
a processor configured to:
generate and concurrently maintain a first environment and a second environment, wherein the first environment displays a first image indicative of the first status of the user, and wherein the second environment displays a second image indicative of the different second status of the user, the second image being different from the first image; and
grant selective access to additional communication devices to the first environment and the second environment, wherein the grant of selective access is based on data associated with users of the additional communication devices, and wherein additional communication devices receiving access to the first environment are restricted from access to the second environment.

19. The system of claim 18, wherein the receiver is further configured to receive from the first communication device a request to generate the first environment and the second environment.

20. The system of claim 19, wherein the request further includes a request to concurrently maintain the first environment and the second environment.

21. The system of claim 18, wherein the data associated with users of the additional communication devices includes a telephone number.

22. The system of claim 18, wherein the data associated with users of the additional communication device includes a PIN code.

23. The system of claim 18, wherein the data associated with users of the additional communication device includes an IP address.

24. The system of claim 18, wherein the first environment is maintained when no users access the first environment.

25. The system of claim 18, wherein the second environment is maintained when no users access the second environment.

26. The system of claim 18, wherein the data indicative of the status of the first user comprises image data.

27. The system of claim 26, wherein the image data comprises an avatar.

28. The system of claim 18, wherein the data indicative of the status of the first user comprises audio data.

29. The system of claim 18, wherein the grant of selective access to additional communication devices is based on instructions received from the first communications device.

* * * * *